April 9, 1929.   M. C. SPENCER   1,708,909

ROTOR FOR INDUCTION MOTORS

Filed Dec. 17, 1925

Inventor,
Millard Cole Spencer,
By　*Samuel W. Balch*
　　　　Attorney.

Patented Apr. 9, 1929.

1,708,909

UNITED STATES PATENT OFFICE.

MILLARD COLE SPENCER, OF EAST ORANGE, NEW JERSEY, ASSIGNOR TO CROCKER-WHEELER ELECTRIC MANUFACTURING COMPANY, OF AMPERE, NEW JERSEY, A CORPORATION OF NEW JERSEY.

ROTOR FOR INDUCTION MOTORS.

Application filed December 17, 1925. Serial No. 75,939.

This invention relates particularly to self-starting alternating-current motors of the induction type, and the object of the invention is to provide a rotor for such a motor which will have a good starting torque with small starting current when the motor is connected directly across the line in starting, and which will also have a high power factor, high efficiency and large overload capacity under operating conditions.

The rotor is provided with an outer and an inner set of low resistance bars with low resistance connections between the inner and outer bars and high-resistance circumferential connections at their ends. During normal operation the inner bars afford low-resistance return circuits for currents generated in the outer bars, thus forming a low-resistance rotor winding which results in a motor having a high efficiency and low slip. During the starting period the inner bars have a high reactance which tends to prevent the flow of current through them and the current from the outer bars is diverted through the high-resistance end rings.

The stator of the motor may be of the usual construction and have the usual phase windings.

In the accompanying sheet of drawings which forms a part of this description,

Figure 1:
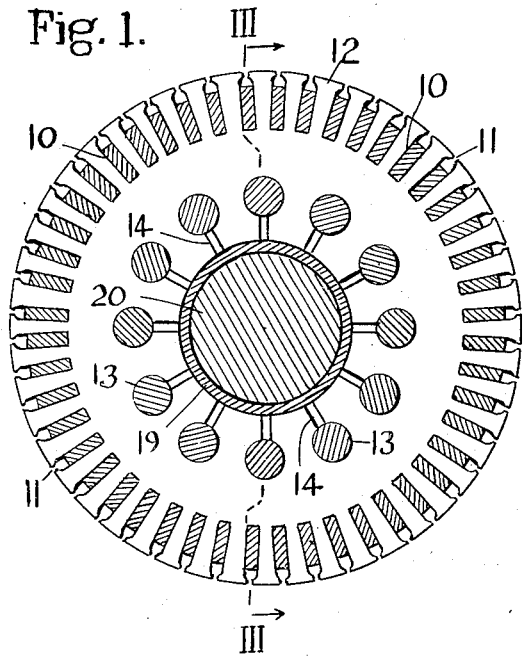
Figure 1 is a transverse section on the line I—I of Fig. 3 through a rotor which embodies this invention.
Figure 2:
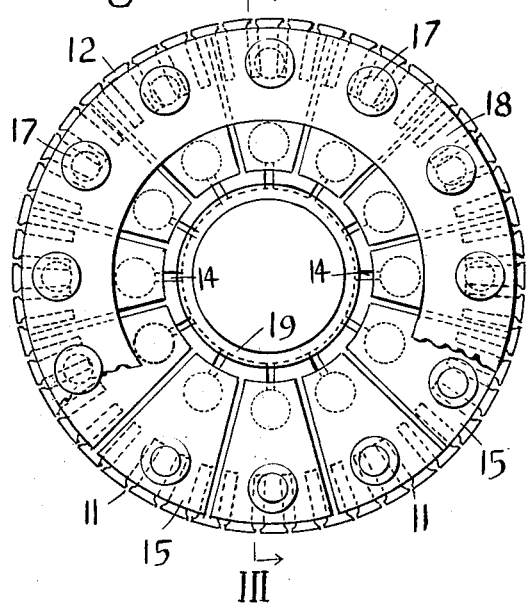
Fig. 2 is an end view with the end ring broken away.
Figure 3:
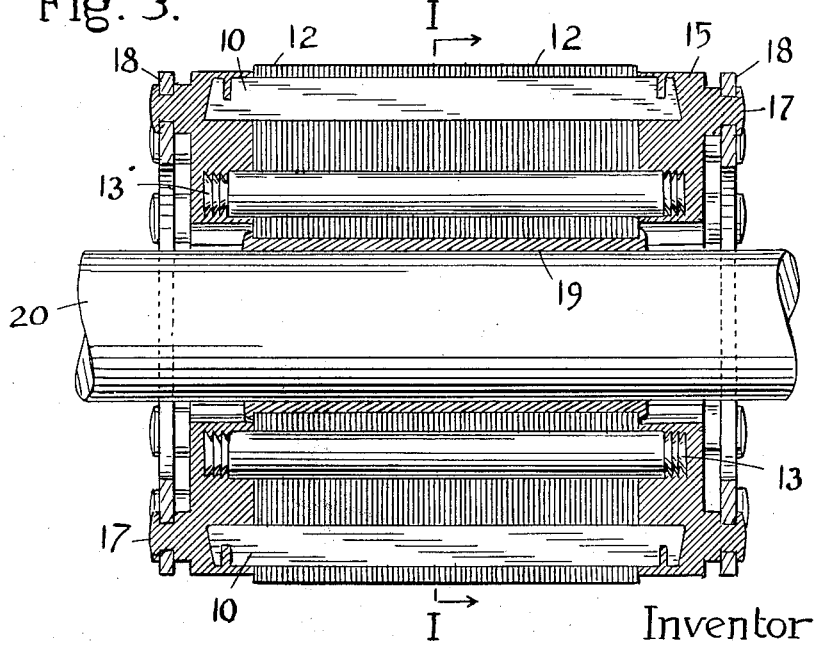
Fig. 3 is a longitudinal section on the line III—III of Figs. 1 and 2.

Outer low-resistance copper bars 10, 10 are placed in partially closed slots 11, 11 in the outer periphery of a laminated annular core 12 and the reactance of these bars is made as small as possible by reducing to a minimum the path for leakage flux across the slots above the bars. Inner low-resistance copper bars 13, 13 are placed in partially closed slots 14, 14 in the inner periphery of the core. The reactance of these inner bars is made large by providing a large path for leakage flux across the partially closed slots at the inner periphery. The outer bars are connected to the inner bars by having their ends cast into low resistance radial connectors 15, 15. Each of these connects a small group of adjoining outer bars with an inner bar. The radial connectors carry projecting pins 17, 17 which serve to connect them to high-resistance connections in a circumferential direction conveniently by end rings 18, 18 of brass or other high-resistance material. The annular core is spaced by a tube 19 of non-magnetic material, as brass, from the shaft 20 and it serves to magnetically insulate the core from the shaft and to clamp the laminations together.

The foregoing constitutes the secondary member of an induction motor and is preferably but not necessarily made the rotor of such a motor.

The characteristics of an induction motor which is provided with such a rotor structure or such that at starting, currents of line frequency will be induced in the outer bars by the revolving magnetic field. These currents will not readily circulate from the outer bars through the radial connectors and the inner bars, because at starting they are at line frequency and the reactance of the inner bars, which is directly proportional to the frequency, will be high and will tend to prevent current from flowing through them. This action forces the current induced in the outer bars through the high-resistance rings from the group of bars subjected to one polarity to the groups of bars which are subjected to opposite polarity where the direction of the induced currents is opposite. The current flow in the rotor winding at starting is therefore similar to that in the usual squirrel-cage rotor. By making the resistance of the rings of a suitable value, a high effective rotor winding resistance under starting conditions can be obtained which results in good starting torque and low starting current. As the rotor comes up to speed the frequency of the current induced in the outer bars becomes less, being inversely proportional to the speed or directly proportional to the slip. The reactance of the inner bars, which is proportional to the frequency of the current becomes less as the rotor speeds up and more current flows through them. At normal speed the frequency of the induced currents is low, the reactance of the inner bars is small and currents from the outer bars have low-resistance return paths through the inner bars and are not diverted through the high-resistance rings. The effective resistance of the rotor circuits is therefore low under running conditions, which results in low slip and high efficiency.

If the slots which contain the inner bars were completely closed, that is were surrounded by low reluctance paths, the motor would have a very poor power factor and low overload capacity. This is because the relatively small currents flowing through the inner bars when the motor is up to speed is sufficient to set up a large flux around the bars and to bring the iron up to magnetic saturation. This large flux would introduce considerable reactance into the motor circuit when the motor is up to speed even at the low frequency of these currents. This would have the objectionable effect of reducing the power factor of the motor and its overload capacity. By using partially closed slots instead, the flux around the inner bars due to the current flowing in them when the motor is up to speed may be greatly reduced and as a result the power factor will be improved and also the overload capacity, while at starting the relatively heavy current in the inner bars is able to bring the iron which surrounds the bars up to saturation, notwithstanding the open slots, and this results in substantially as high a reactance as if the slots were closed.

For good performance under running conditions, that is, good power factor and large overload capacity, the reactance of the inner bars under running conditions should be as low as possible. Under starting conditions the reactance of the inner bars must be made large enough to limit the current drawn from the line. It is therefore desirable that the ratio of the reactance of the inner bars under starting conditions to the reactance of these bars under running conditions should be made as large as possible. If closed slots are used, then the iron around the bars will be practically up to the magnetic saturation both at starting and under running conditions. There will be about the same amount of magnetic flux around the bars in both cases and the reduction in the reactance of the bars as the motor comes up to speed will be due only to the reduction in the frequency of the rotor currents. However, if partially closed slots are used and they are so proportioned that the iron around the bars is only just brought up to magnetic saturation by the heavy currents in the bars at starting, then the reactance of the bars will be reduced as the motor comes up to speed not only by the reduction in frequency of the current but also by the reduction in magnitude of the flux around the bars as this flux will be substantially proportional to the current and will be reduced with the current as the motor comes up to speed.

If only light starting duty is required the high-resistance rings may be omitted. This reduces the current which is drawn from the line at starting but also reduces the starting torque.

I claim:

1. A rotor for an induction motor comprising a shaft, a non-magnetic tube surrounding the shaft, a laminated annular core on the tube with partially closed slots in its outer periphery and partially closed slots in its inner periphery, bars of low resistance in the slots, conductive connectors in a radial direction between the ends of each of groups of the bars in the slots in the outer periphery and the end of a bar in a slot in the inner periphery, and high resistance connectors between the ends of the bars in a circumferential direction, the slots in the outer periphery being proportioned to give the bars in them a low reactance and the slots in the inner periphery being proportioned to give the bars in them a high reactance.

2. A rotor for an induction motor comprising a laminated annular core magnetically insulated from the shaft, the core having partially closed slots in its outer periphery and partially closed slots in its inner periphery, bars of low resistance in the slots, and conductive connectors in a radial direction between the ends of the bars in the slots in the outer periphery and the ends of the bars in the slots in the inner periphery forming independent closed loops, the slots in the outer periphery being proportioned to give the bars in them a low reactance and the slots in the inner periphery being proportioned to give the bars in them a high reactance.

3. A rotor for an induction motor comprising a laminated annular core magnetically insulated from the shaft, the core having partially closed slots in its outer periphery and partially closed slots in its inner periphery, bars of low resistance in the slots, conductive connectors in a radial direction between the ends of the bars in the slots in the outer periphery and the ends of the bars in the slots in the inner periphery forming closed loops, and high resistance connectors between the ends of the bars in a circumferential direction, the slots in the outer periphery being proportioned to give the bars in them a low reactance and the slots in the inner periphery being proportioned to give the bars in them a high reactance.

4. A rotor for an induction motor comprising a shaft, a non-magnetic tube surrounding the shaft, a laminated annular core on the tube with partially closed slots in its outer periphery and partially closed slots in its inner periphery, bars of low resistance in the slots, and conductive connectors in a radial direction between the ends of each of groups of the bars in the slots in the outer periphery and the end of a bar in a slot in the inner periphery, the slots in the outer periphery being proportioned to give the bars in them a low reactance and the slots in the inner periphery being proportioned to give the bars in them a high reactance.

MILLARD COLE SPENCER.